United States Patent [19]

Webb et al.

[11] 4,359,298
[45] Nov. 16, 1982

[54] METHOD AND APPARATUS FOR THE FILLING OF A SLURRY SUMP

[75] Inventors: Frederick A. Webb, Fairmont; Richard E. Doerr, Morgantown, both of W. Va.

[73] Assignee: Conoco Inc., Ponca City, Okla.

[21] Appl. No.: 222,838

[22] Filed: Jan. 6, 1981

[51] Int. Cl.³ .............................................. B65G 53/30
[52] U.S. Cl. ......................................... 406/3; 406/28; 406/109; 406/155
[58] Field of Search .................... 406/3, 28, 109, 115, 406/155, 164; 137/101.21, 101.25; 414/294, 323

[56] References Cited

U.S. PATENT DOCUMENTS 3,981,541 9/1976 Doerr et al. .................... 406/109 X
4,143,921 3/1979 Sweeney et al. ................ 406/109 X

*Primary Examiner*—Jeffrey V. Nase
*Attorney, Agent, or Firm*—William J. Miller

[57] ABSTRACT

A method for filling an elongated sump which has a plurality of diverter gates emptying into the sump is accomplished by dividing the sump into a plurality of adjacent zones along each side of the sump and adding slurry in each of the zones in sequential order in a direction related to the direction of movement of a dredge removing material from the sump. The sequencing automatically skips the zone where the dredge is removing material and empties it during that period of time in the sequence just previously emptied.

12 Claims, 2 Drawing Figures

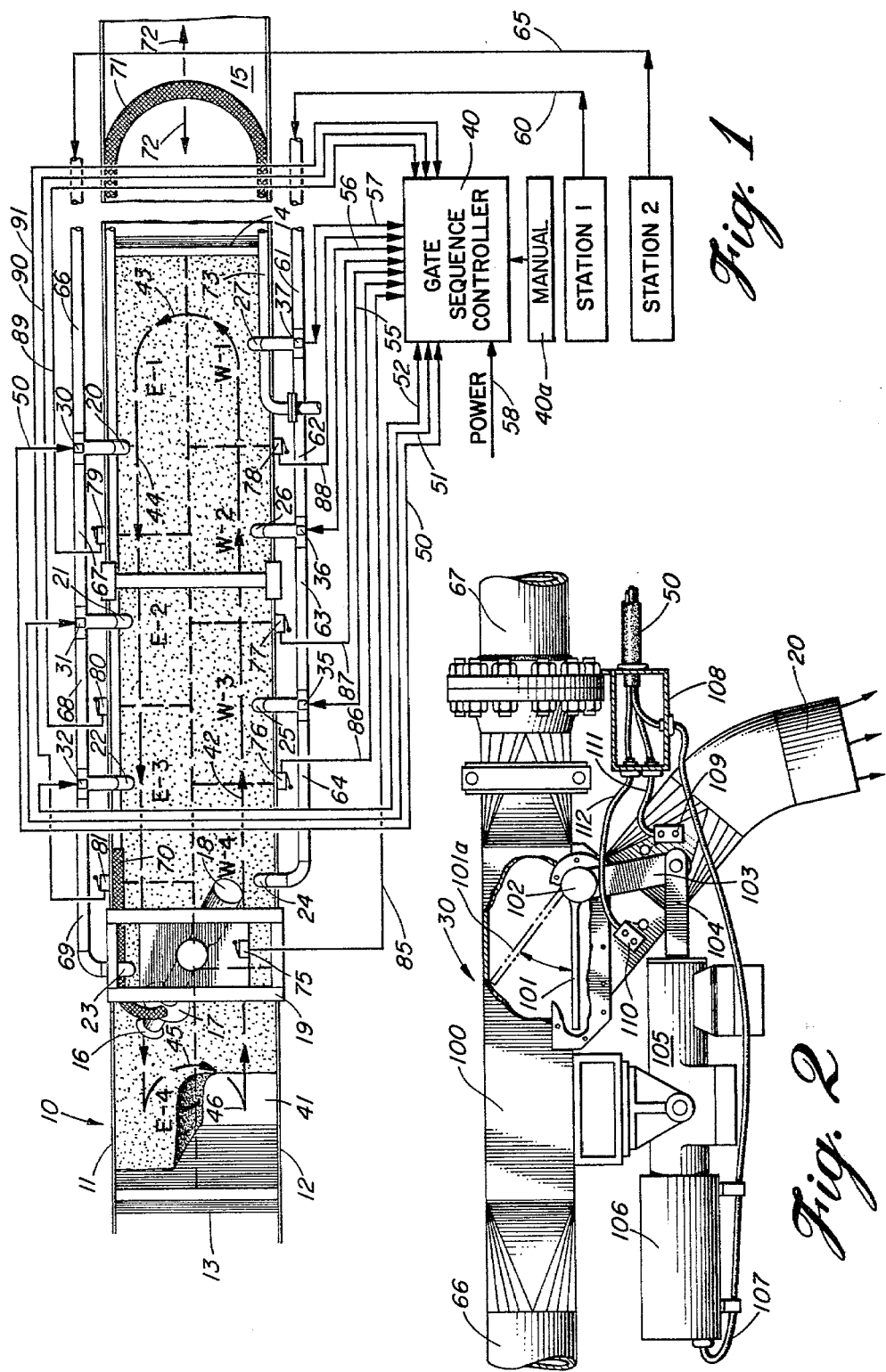

METHOD AND APPARATUS FOR THE FILLING OF A SLURRY SUMP

DISCUSSION OF THE PRIOR ART

An application Ser. No. 171,605 filed July 23, 1980, titled "Slurry Tram Control Apparatus" by Richard E. Doerr, describes both a method and apparatus for removing material from a sump which has substantially parallel and elongated side walls and has a longitudinal axis. The sump is enclosed with ends and a bottom and is adapted for filling with a water/solid mixture to form a slurry. A suction pump is mounted above the sump and extends into the sump for removal of the water and solid material. Apparatus is attached to the suction pump for moving the suction pump along the longitudinal axis of the sump. When the suction pump reaches the end of the sump, apparatus rotates the pump through a 180 degree arc and then the moving apparatus again moves the sump along the longitudinal axis to the other end where it is again rotated in the opposite direction through a 180 degree arc to the original point for repeating the process.

Another application, Ser. No. 171,600 filed July 23, 1980, titled "Slurry Pump Tram Control Apparatus" by Richard E. Doerr, is related to the previously-described application and basically describes a method for moving the suction pump at a rate which maintains the concentration being removed at a predetermined value. Control apparatus is described for maintaining the tram rate of the pump such that the concentration will be precisely controlled.

BRIEF DESCRIPTION OF THE INVENTION

This invention relates to a sump described in the two previous applications and deals specifically with the method for filling the sump with a water/slurry mixture. This invention discloses a sump where a plurality of slurry inputs are spaced along the first and second sidewalls of the sump. The inputs are spaced to form adjacent zones along the first and second sidewalls. Slurry input control apparatus selectively discharges slurry from one of the slurry inputs. Apparatus is provided for sequentially discharging slurry from the inputs on a predetermined time basis such that each adjacent zone along either the first or second sidewall is sequentially filled with slurry from the inputs. Apparatus is also provided for determining the zone where the dredge is removing slurry and includes apparatus for operating the slurry input control apparatus in a manner to direct the slurry to an input to a zone immediately preceding the zone where the dredge is operating during the time sequence when the slurry control apparatus would be discharging the slurry from the input in the zone where the dredge is operating. Feedback apparatus is also provided to determine the actual position of the diverter gate so that the control apparatus can determine whether a gate is open or closed.

BRIEF DESCRIPTION OF THE FIGURES

FIG. 1 is a top view of a sump illustrating the inputs to the sump and the diverter control apparatus for controlling the movement of slurry from the remote areas to and into the sump; and, FIG. 2 illustrates a single diverter gate used in the apparatus of FIG. 1.

DETAILED DESCRIPTION OF THE INVENTION

A sump generally referred to by arrow 10 has sidewalls 11 and 12, and an end 13, and a second end 14. A water reservoir 15 is partially illustrated and additional water/silt separation basins in the sump, water addition apparatus to the sump and other portions of the sump are not illustrated since they do not relate directly to the invention disclosed herein.

Basically, the sump includes a dredge 16 coupled to a pump 17 which is driven by a motor 18, all of which is supported on an overhead tramming apparatus 19 which runs on rails supported above the sump (such rails are not illustrated in the drawing).

Along sidewall 11 is a plurality of inputs 20, 21, 22 and 23. Along side 12 is a similar set of inputs 24, 25, 26 and 27. Each of the slurry input means 20 through 27 has a corresponding diverter gate with the exception of inputs 23 and 24. Thus, slurry input 20 has a diverter gate 30; input 21 has a diverter gate 31; and input 22 has a diverter gate 32. And correspondingly, input gate 25 has a diverter gate 35; input gate 26 has a diverter gate 36; and input gate 27 has a diverter gate 37.

Each diverter gate is controlled by an apparatus called a gate sequence controller 40. Sequence controller 40 provides power to each of the diverter gates which opens or closes a diverter gate and likewise receives information from the diverter gate via microswitches which will determine the position of the diverter gate. A full description of the diverter gate will be included in a description of FIG. 2.

Information to the diverter gates is carried along communication cable 50 to diverter gate 30; along communication cable 51 to diverter gate 31; and along communication cable 52 to diverter gate 32. Correspondingly, information is carried along cable 55 to diverter gate 35; cable 56 to diverter gate 36; and cable 57 to diverter gate 37. Power is supplied to sequence controller from any usual source of power 58.

Each of the diverter gates is supplied from a remote source of slurry which may be for example a coal and water mixture. Such coal and water mixture can be transmitted, for example, station 1 through pipe 60 to a pipe 61 which is coupled to diverter gate 37; a pipe 62 which is coupled to diverter gate 36; a pipe 63 which is coupled to diverter gate 35; and a pipe 64 which is coupled to slurry outlet 24. Correspondingly, station 2 is coupled to a pipe 65; to pipe 66, which is coupled to diverter gate 30; pipe 67 which is coupled to diverter gate 31; pipe 68 which is coupled to diverter gate 32; and pipe 69 which is coupled to slurry input 23.

The output from the dredge 16 is coupled from pump 17 to a pipe 70 and to a floating portion 71 which is free to move back and forth as indicated by arrows 72 on the floating portion 15 of sump 10. It eventually is coupled through a pipe 73 to a further means for disposing of the slurry which can for example be a lift system which will move the slurry to the surface of the ground, and to a processing plant or to any other normal disposition source for the slurry being moved out of pipe 73.

Referring specifically to sump 10, a region 41 is left empty of slurry so that dredge 16 can initially start up in empty portion 41. The path that dredge 16 follows is indicated by arrows 42. When reaching end 14, the dredge is rotated through an arc 43 where it follows a second parallel path 44. Upon reaching end 13, the dredge will again follow an arcuate path 45 to the point 46 where it began. The position of the dredge during its travel through paths 42, 43, 44, 45 and back to its original position 46 are important to the operation of the sequencing of the slurry from inputs 20 through 27.

In order to determine the position of the dredge at any particular time, microswitches 76, 77, 78, 79, 80 and 81 are all positioned at the boundaries of the zones (to be described at a subsequent portion of the application) and each are coupled through wires to the gate sequence controller 40. Switch 75, which determines the position of the dredge, is coupled through a wire 85; switch 76 through a wire 86; switch 77 through a wire 87; and switch 78 through a wire 88 to sequence controller 40. Likewise, switch 79 is coupled through a wire 89; switch 80 through a wire 90; and switch 81 through a wire 91 to gate sequence controller 40.

Referring to FIG. 2, one of the diverter gates is illustrated such as 30, for example, which has a housing 100, coupled to an inlet pipe 66, and to an outlet pipe 67. Diverter gate has a gate 101 which is coupled to a shaft 102. Shaft 102 is coupled to a lever 103, and to the shaft 104 of an actuator 105. Actuator 105 may be electric and driven by a motor 106. The motor has electrical wires 107 which are connected to a junction box 108. In the case of diverter valve 30, junction box 108 would be connected to wire cable 50.

In order to determine the position of gate 100, a pair of microswitches 109 and 110 are connected respectively through wires 111 and 112 to junction box 108 and in turn connected to cable 50 and subsequently to gate sequence controller 40.

OPERATION

The procedure for refilling the sump with a slurry comprising water and solid mixture such as coal while reclaiming is taking place, must meet several constraints. First, the slurry input system must distribute the incoming material evenly along the length of the storage area. Second, the system must be laid out to leave one area empty of material so that the dredge reclaimer can be started on liquid only. Third, the slurry input system must not dump incoming slurry directly on top of the dredge reclaimer. To do so might cause problems such as intake of entrained air, bubbles by the dredge 16 or other problems.

The system above described operates four slurry input pipes distributed along each side of the sump. In the particular embodiment constructed in accordance with the teachings of this invention, the sump is basically lying North and South. And so the zones within the sump are labeled either East or West, and numbered in accordance with their position in the sump; thus E-1 is the first East position; E-2, E-3 and E-4 are adjacent zones progressing in the Northerly direction. W-1, W-2, W-3 and W-4 are zones on the West side of sump 10 progressing generally in the Northerly direction.

FIG. 1 illustrates the path followed by the dredge reclaimer in its cyclical operation as it progresses along direction indicated by path 42, it passes sequentially from zones W-4, W-3, W-2 to zone W-1 where it is rotated through 180 degrees as illustrated by path 43 and subsequently travels then along path 44 through zones E-1, E-2, E-3 and E-4. Once the dredge reaches the position as indicated as E-4, it is again rotated clockwise in the direction of arrows 45 to its original starting position at 46.

It is extremely important to place the material into the sump so that it is evenly distributed along the entire length of the sump, with the exception of region 41 which must remain clear of material at all times.

Under normal operation of the sump, the logic sequence will control the gate 101 (see FIG. 2) in either the position illustrated or in the open position shown by the dotted line and labeled 101-A. In position 101, the fluid will flow directly from pipe 66 to pipe 67. When in position 101-A, the slurry will flow to pipe 66 and out input 20.

With the dredge 16 on the east side of the sump 10 the west side will be filled on a time shared basis from each output. For zones W-4, W-3, W-2 and W-1 the gate sequence controller 40 will be providing on a time share basis, outputs sequentially to input 24, then input 25, input 26 and input 27. The sequence will continue to be repeated until dredge apparatus 16 moves to the west side and begins removing material from zone W-4. The timing of the gate sequence is selected to be slightly slower than the tramming rate of dredge 16.

As dredge 16 moves into zone W-3, switch 76 will be operated, communicating the information through wire 86 to gate sequence controller 40. This information informs the gate sequence controller that the dredge 16 is now in zone W-3 and has passed out of zone W-4. When this occurs, W-3 will now be skipped automatically. That is, the diverter gate 101 will remain in the closed position during the complete time that dredge 16 is in zone W-3. The sequence will then dump out of input 24 only.

Zone W-4 just had all of its material removed; therefore, it is substantially empty. Thus, the material normally going into W-3 can be easily received by zone W-4.

As dredge 16 moves from zone W-3 to W-2, it will trigger switch 77, which will be communicated down wire 87 to gate sequence controller 40. When this occurs, the sequence will then pass from W-4 to W-3. The remaining zones and their associated switches and gates operate in the same manner.

The logic control system for sump 10 shown in FIG. 1 can be divided into two discrete sub-systems. One sub-system controls input pipes 20, 21, 22 and 23 to East 1, East 2, East 3, and East 4, respectively. The other sub-system controls input pipes 27, 26, 25 and 24 to West 1, West 2, West 3, and West 4, respectively. Since these two sub-systems operate in the same manner and are independent of each other only the control logic for the east side of the sump will be described. First, the diverter gate logic for the east side will be discussed for cases when the dredge reclaimer is operating on the west side of the sump following path 42.

When there is no operator intervention using the manual control 40a at gate sequence controller 40, the slurry is dumped into a zone for a timed period which is constant but can be of any length. After this time period the logic automatically operates the diverter gate valves and dumps slurry into the zone north of the previous zone. After dumping into this zone for the timed period the logic again advances the slurry flow to the next zone. The dump sequencing is always advanced in the same direction as traveled by the dredge reclaimer when operating on that side of the sump. The above is true for all zones except when sequencing from the zone located at the end 13 of sump 10 where the dredge reclaimer 16 moves to the opposite side along arc 45. After dumping into zone E-4 for a timed period the logic would then dump into zone E-1. This automatic sequencing of the diverter gates will continue as long as there is no operator intervention and the dredge reclaimer 16 remains on the opposite side of the sump.

As long as the dredge is on the west side of the sump the operator can manually divert the slurry flow into any of the east zones. This manual select function 40a overrides the automatic sequence. After the new zone is selected the logic will again automatically sequence the flow to the other zones as previously described.

Each of the east zones also has a manual skip function which will prevent the logic from dumping slurry into zones which the operator selects. As long as there are two zones on the east side of the sump which are not skipped, the logic will still automatically divert the slurry between the two unskipped zones. If three zones are skipped on the east side then flow will be diverted to the fourth zone, which is not skipped. This will prevent flow from going to the other zones as long as the operator so desires. When a zone is skipped the manual select pushbutton for that zone is disabled. The following Table 1 shows examples of the zone dump sequencing for different combinations of the skip function. These examples are for cases when the dredge reclaimer is on the west side of the sump.

TABLE I

| East Zone Sequence Examples With Dredge on West Side | |
|---|---|
| East Zones Manually Skipped | Automatic Zone Dump Sequencing |
| No zones skipped | E1 E2 E3 E4 E1 etc. |
| E1 | E2 E3 E4 E2 E3 etc. |
| E3 | E1 E2 E4 E1 E2 etc. |
| E3 and E4 | E1 E2 E1 E2 etc. |
| E2, E3, and E4 | E1 E1 E1 etc. |
| E1, E2, and E4 | E3 E3 E3 etc. |
| (not all possible combinations shown) | |

The remainder of the logic description will cover cases when dredge 16 is located on the east side of the sump. When the dredge reclaimer motor 18 is not running the zone in which dredge 16 is located is automatically skipped. This occurs without any operator action. Automatically skipping the zone prevents coal from being dumped onto a dredge which is not reclaiming. The manual zone select pushbutton for a zone is disabled whenever the dredge is in the zone in question. This prevents the operator from manually selecting a zone and dumping slurry on the dredge.

When the dredge motor 18 is running and dredge 16 enters a zone which slurry is being dumped, the logic automatically diverts the flow to the zone directly behind the dredge. For example, if the dredge 16 enters zone W-3, then slurry will be dumped into zone W-4. If this zone has been manually skipped the flow will be diverted to the zone behind the skipped zone as, for example, W-1. If two zones were skipped directly behind dredge 16 the flow will be diverted back one more zone as long as it is not skipped also. If there are at least two zones that are not skipped the logic will divert the flow from dredge 16 when it enters a zone which is being dumped into. If any three out of four zones are skipped there will be times when the logic cannot divert the flow from the dredge. Anytime slurry is dumped on the dredge for 30 seconds an alarm annunciator goes off and alerts the operator to this abnormal condition. Table II has some examples of the logic for cases when the dredge enters a zone into which slurry is being dumped.

TABLE II

| Examples of Action When the Dredge Reclaimer Moves Into A Zone Where Slurry is Being Dumped | | |
|---|---|---|
| Zone Into Which Slurry is Being Dumped when Dredge Enters | Zones Manually Skipped | Zone Which Flow is Diverted |
| E3 | None | E2 |
| E4 | None | E3 |
| E1 | None | E4 |
| E3 | E2 | E1 |
| E2 | E1 | E4 |
| E2 | E1, E4 | E3 |
| E3 | E1, E2 | E4 |
| E2 | E1, E3, E4 | E2 - no automatic action can be taken (alarm condition) |

When dredge 16 is running in a particular zone the logic will not divert the slurry flow to that zone. After each timed period the logic checks to see if the next automatic advance will dump on the dredge. If it will, the logic does not take any action. If the dredge has moved by the next timed period, the diverter gates will advance the slurry input to the zone which was previously occupied by the dredge. The following (Table III) shows some examples of this action.

TABLE III

| Examples of Zones Where the Gate Sequence Will Wait When the Dredge Reclaimer is in the Next Zone in Sequence | | |
|---|---|---|
| Zone in Which Dredge is Reclaiming | Zones Manually Skipped | Zone Which Flow Will Be Dumped Until Dredge Moves to Next Zone |
| E1 | None | E4 |
| E4 | None | E3 |
| E2 | None | E1 |
| E2 | E1 | E4 |
| E1 | E4 | E3 |
| E2 | E1, E4 | E3 |
| E4 | E2, E3 | E1 |
| (these are examples - not all possible combinations are included) | | |

CONCLUSION

A method for distributing material from a plurality of inputs to an elongated sump has been described. The system will distribute materially evenly throughout the sump and yet at the same time prevent diverter valves from being opened when the reclaimer or dredge is in a particular zone next to an input to the sump.

The apparatus will also permit the diverter gates to move the input of slurry to another zone when the particular input will drop slurry onto the same zone or area where the dredge is operating either by movement of the dredge or intervention of the apparatus of the diverter gate, thereby preventing the emptying of slurry onto the dredge.

It is obvious that changes can be made in the particular device described and still be well within the scope of the invention as set out in the specification and depending claims.

What we claim is:

1. Method for filling an elongated sump having first and second side walls, ends and a bottom, said sump adapted for filling with a slurry of water and mineral and having a plurality of spaced slurry inlets along each of said side walls and a dredge mounted for movement along the length of said sump and positioned to traverse the length along one side wall, rotate to a location adjacent said remaining side wall, traverse said length of said remaining side wall and rotate to the original position, an improvement in adding slurry to said sump comprising:
  (a) dividing said sump into a plurality of adjacent zones along said first side wall;
  (b) dividing said sump into a second plurality of zones along said second side wall;
  (c) adding slurry in each of said first zones in sequential order in a direction related to the direction of movement of said dredge adjacent said first side wall;
  (d) adding slurry in each of said second zones in sequential order in a direction related to the direction of movement of said dredge when it is moving adjacent said second side wall;
  (e) sequencing the addition of slurry into any of said first or second zones when said individual zone is occupied by said dredge by adding slurry to the zone adjacent said occupied zone which adjacent zone was just previously occupied by said dredge.

2. Method as described in claim 1 wherein said slurry is added to said sump in said first or second zones in a sequence which is in the same direction as the movement of said dredge.

3. Apparatus for controlling the addition of slurry to an elongated sump having a longitudinal axis and first and second side walls, ends and a bottom; a dredge for removing slurry from said sump, said dredge mounted for movement parallel and adjacent to said first side wall until reaching one end of said sump, rotation to a position adjacent said second side wall, movement parallel to said adjacent said second side wall until reaching said remaining end, and rotation to the original position; apparatus for adding slurry to said sump comprising means for mounting a plurality of slurry inputs along the first and second side walls of said sump, said slurry inputs spaced to form adjacent zones along said first and second side walls and said longitudinal axis; means connecting said inputs to a source of slurry including diverter means each having a diverter control means, coupling said connecting means to said slurry inputs for selectively discharging said slurry at said connected input or a subsequent slurry input; means for sequentially discharging slurry from said inputs on a predetermined time basis such that each adjacent zone along said first or second side wall is sequentially filled with slurry from said inputs; means for determining the zone where said dredge is removing slurry; means responsive to said determining means for operating said diverter control means in a manner to direct said slurry to an input for a zone immediately preceding the said zone where said dredge is operating.

4. Apparatus as described in claim 3 wherein said means for determining the zone when said dredge is removing slurry comprises switch means mounted at the boundary between each of said zones.

5. Apparatus for filling an elongated sump having first and second side walls, ends and a bottom, said sump adapted to be filled with a slurry, a dredge for removing slurry from said sump, said dredge mounted to move parallel and adjacent to each side, apparatus for adding slurry to said sump from a remote source means comprising:
  (a) slurry input means spaced along each of said first and second side walls;
  (b) diverter means selectively coupling said slurry input means either to said remote source means or to a next succeeding slurry input means;
  (c) diverter control means for sequentially coupling said remote source means on a predetermined time basis to each adjacent slurry input means;
  (d) dredge position sensing means;
  (e) processing means coupled to said dredge position sensing means and said diverter control means for determining the position of said dredge and controlling the sequencing of said diverter control means to cause the diverter means to couple the slurry from said remote source to a slurry input means immediately preceding the slurry input means in the region of said dredge.

6. Apparatus as described in claim 5 wherein said remote source means comprises first and second locations and wherein said first location is coupled to the slurry input means along said first side and said second location is coupled to the slurry input means along said second side.

7. Apparatus as described in claim 5 wherein said sump is divided into zones and wherein each slurry input means is mounted centrally in each zone.

8. Apparatus as described in claim 7 wherein each zone is adjacent each other and an axial laying longitudinally along said sump.

9. Apparatus as described in claim 8 wherein a region is left empty of slurry to provide a start-up location for said dredge.

10. Apparatus as described in claim 7 or 8 wherein said position sensing means comprises a switch at the boundary of each zone which is actuated by the movement of said dredge.

11. Apparatus as described in claim 5, 6, 7 or 8 wherein each of said diverter means includes a diverter position sensing means coupled to said processing means to feed back to said process means a response signal related to the operation of said diverter means.

12. Apparatus for controlling the level of slurry in an elongated sump having a longitudinal axis, first and second side walls, ends and a bottom, said apparatus comprising:
  (a) dredge for removing slurry from said sump, said dredge mounted for movement parallel and adjacent to said first side wall until reaching one end of said sump, rotation to a position adjacent said second side wall, movement parallel and adjacent to said second side wall until reaching said other end of said sump, and rotation to the original position;
  (b) a plurality of slurry inputs along the first and second side walls of said sump, said slurry inputs spaced to form adjacent zones along said first and second side walls and said longitudinal axis;
  (c) slurry input control means for selectively discharging slurry from one of said slurry inputs;
  (d) means for sequentially discharging slurry from said inputs on a predetermined time basis such that each adjacent zone along said first or second side wall is sequentially filled with slurry from said inputs;
  (e) means for determining the zone where said dredge is removing slurry; and
  (f) means responsive to said determining means for operating said slurry input control means in a manner to direct said slurry to an input for a zone immediately preceding the said zone where said dredge is operating during the time sequence when said slurry input control means would be discharging slurry from said input to the zone where said dredge is operating.

* * * * *